E. A SPERRY.
OBSERVATION APPARATUS FOR SUBMARINES.
APPLICATION FILED JAN. 20, 1917.

1,393,844.

Patented Oct. 18, 1921.

4 SHEETS—SHEET 1.

INVENTOR
ELMER A. SPERRY
BY
Herbert H. Thompson
ATTORNEY.

E. A SPERRY.
OBSERVATION APPARATUS FOR SUBMARINES.
APPLICATION FILED JAN. 20, 1917.

1,393,844.   Patented Oct. 18, 1921.
4 SHEETS—SHEET 2.

INVENTOR
ELMER A. SPERRY
BY
Herbert H. Thompson
ATTORNEY.

E. A SPERRY.
OBSERVATION APPARATUS FOR SUBMARINES.
APPLICATION FILED JAN. 20, 1917.
1,393,844.
Patented Oct. 18, 1921.
4 SHEETS—SHEET 3.
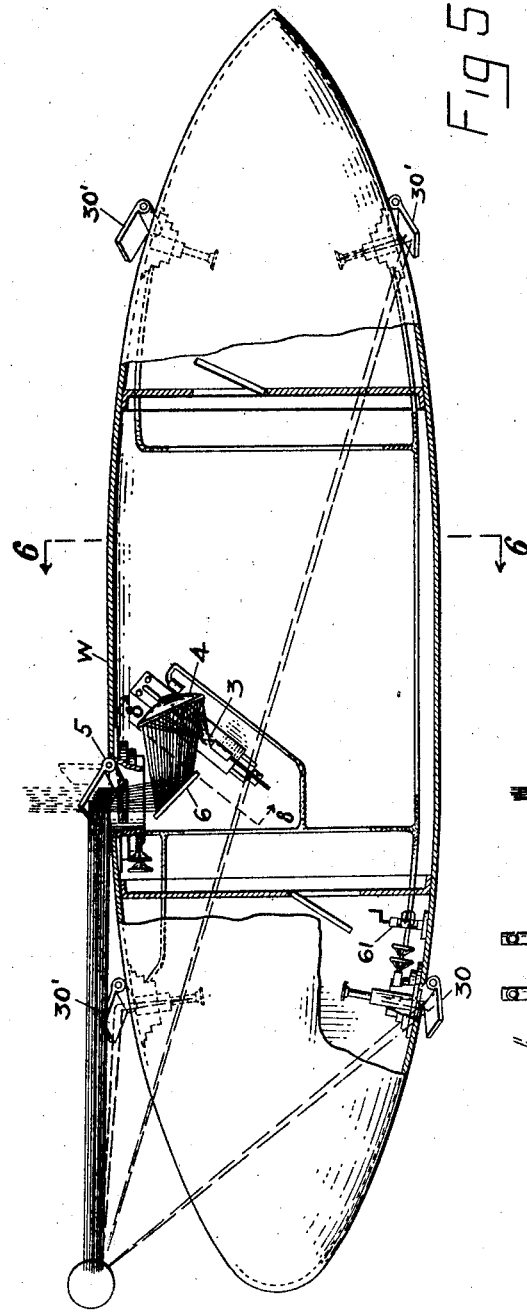
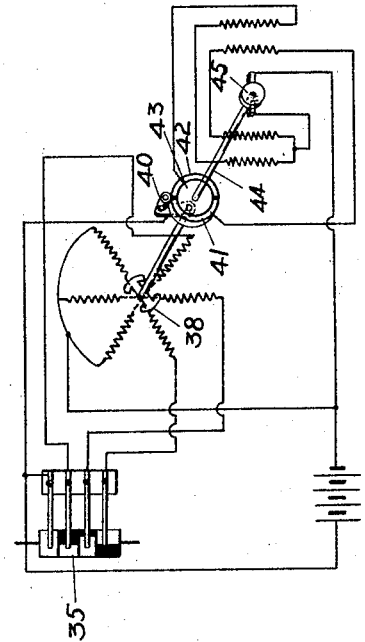
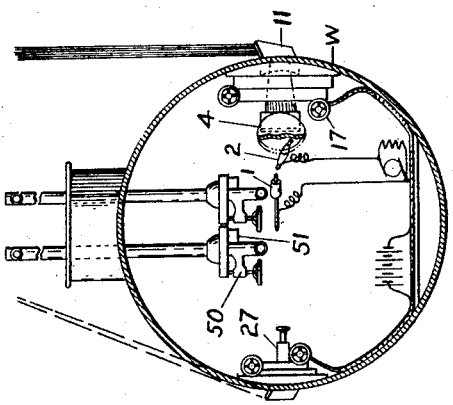
INVENTOR
ELMER A. SPERRY
BY
Herbert H. Thompson
ATTORNEY.

E. A SPERRY.
OBSERVATION APPARATUS FOR SUBMARINES.
APPLICATION FILED JAN. 20, 1917.
1,393,844.
Patented Oct. 18, 1921.
4 SHEETS—SHEET 4.
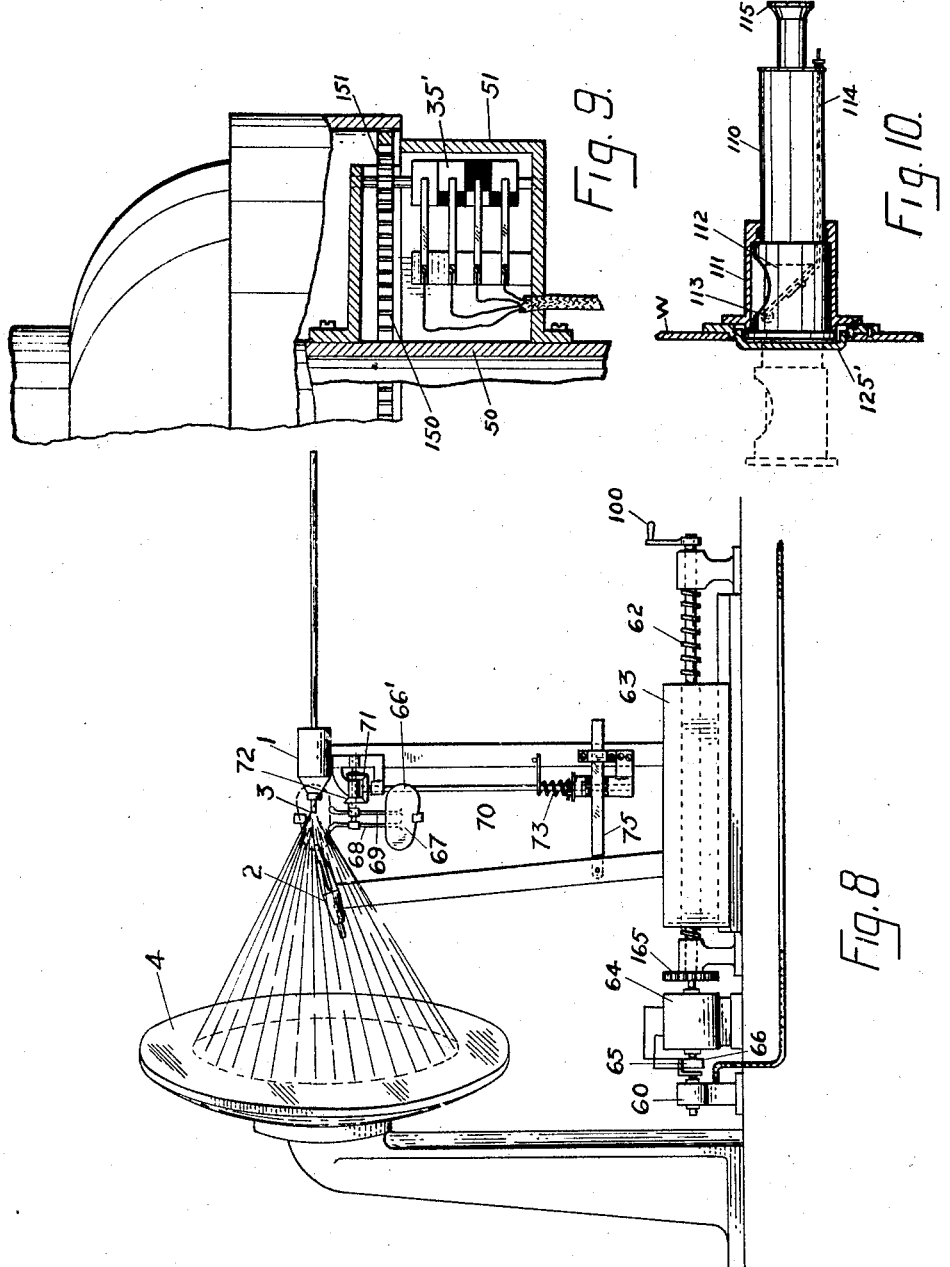
INVENTOR
ELMER A. SPERRY
BY
Herbert H. Thompson
ATTORNEY.

UNITED STATES PATENT OFFICE.

ELMER A. SPERRY, OF BROOKLYN, NEW YORK.

OBSERVATION APPARATUS FOR SUBMARINES.

1,393,844.	Specification of Letters Patent.	Patented Oct. 18, 1921.

Application filed January 20, 1917. Serial No. 143,443.

*To all whom it may concern:*

Be it known that I, ELMER A. SPERRY, a citizen of the United States of America, residing at 1505 Albermarle road, Brooklyn, in the county of Kings and State of New York, have invented certain new and useful Improvements in Observation Apparatus for Submarines, of which the following is a specification.

This invention relates to submarine vessels and its main object is to provide a means whereby one may see from such vessels when submerged. The problem of providing a practicable means for seeing from a submarine while under water is very difficult on account of the high light absorbing qualities of any great thickness of water.

My preferred method of accomplishing this result is to provide an extremely brilliant light source within the submarine and to concentrate the rays therefrom so that a very intense beam of small diameter is projected from the submarine. The object to be observed is viewed from one or more sighting devices positioned preferably at a distance from the searchlight.

Figure 1:
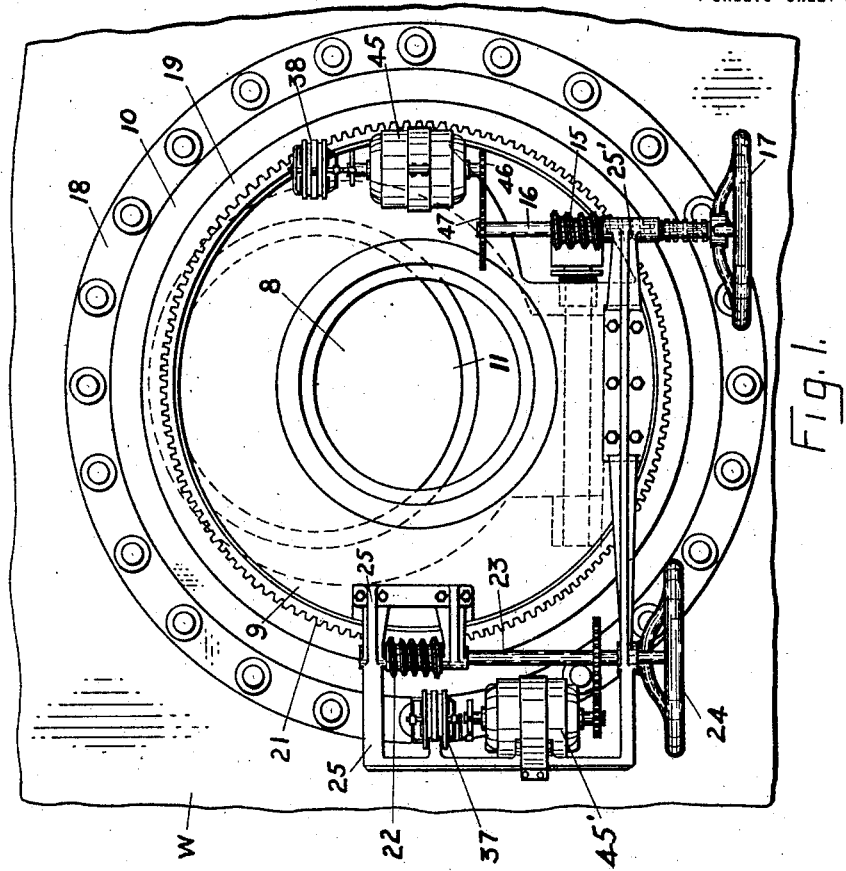
Figure 2:
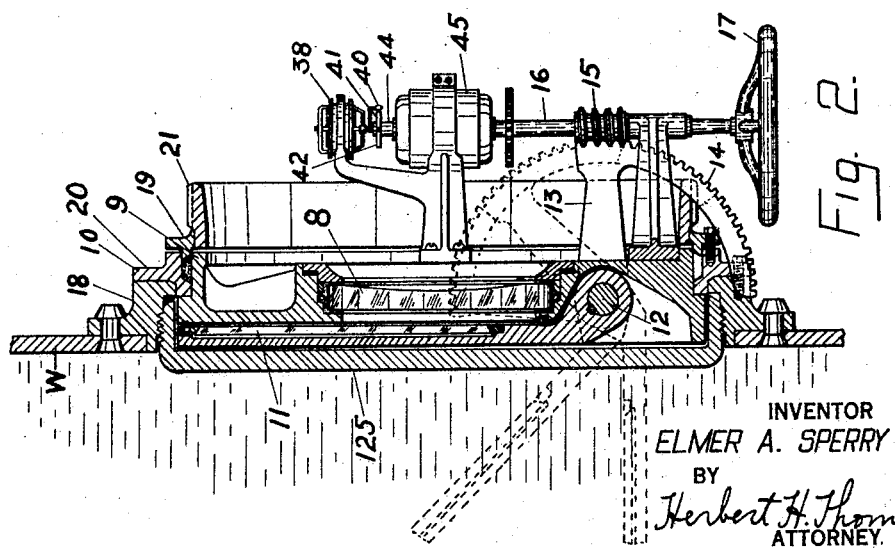
Figure 4:
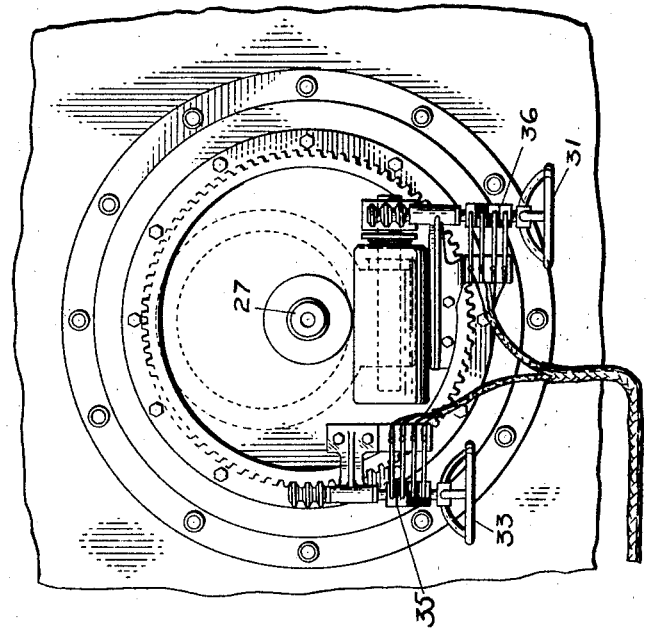
Figure 3:
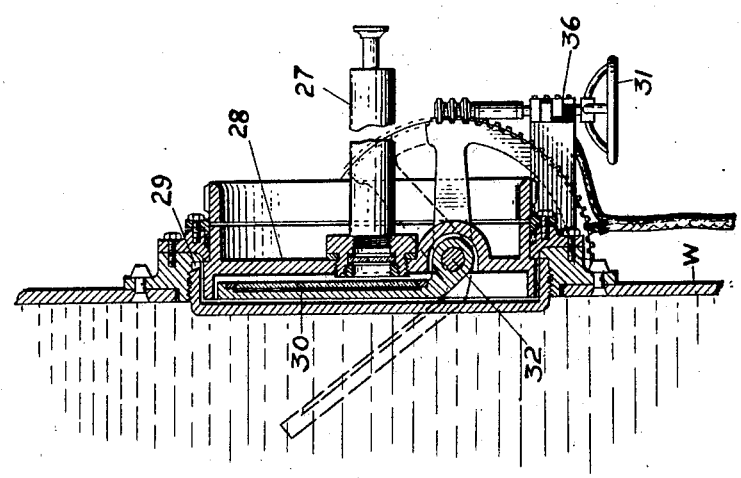

Referring to the drawings in which what I now consider to be the preferred forms of my invention are shown: Figure 1 is an interior elevation of the opening in the wall of the submarine through which the light is projected and of the closure therefor. Fig. 2 is a vertical section thereof. Fig. 3 is a vertical section through one of the sighting instruments as it is mounted in the wall of the submarine. Fig. 4 is an interior elevation thereof. Fig. 5 is a diagrammatic plan view with portions broken away of a submarine showing the position of my apparatus therein. Fig. 6 is a vertical section of the submarine near the conning tower. Fig. 7 is a wiring diagram showing the electrical control for changing the direction of the beam from a distance. Fig. 8 is a view of the side elevation of the searchlight. Fig. 9 is an enlarged detail of one of the periscopes on the submarine. Fig. 10 shows a modified form of sighting device.

As a source of illumination I prefer my high intensity arc lamp, such as shown in my patent application on searchlights, No. 21,661, filed April 16, 1915, in which a flaming arc light is employed. The mechanism as shown in Fig. 8 consists of a positive electrode holder 1, and negative electrode holder 2 through each of which the electrodes are fed by mechanism not shown.

The positive crater 3 is faced toward the projector 4 which is preferably in the form of a condenser; that is, it is shaped so as to cause converging rays to emerge therefrom. The beams are projected from said condenser without the submarine through a window 5 in the wall W of the submarine. The condenser may be positioned at an angle to said window and the beam turned through the window by a reflector 6 in order to save space within the submarine. The window 5 preferably consists of a lens 8 adapted to render the converging rays parallel after passing therethrough. For this purpose the lens may be made concave on one or both sides. Said lens is preferably mounted on annular member 9 which is rotatably mounted within the watertight seat 10. A light deflecting means 11 which may consist of a mirror is pivotally connected to member 9 at 12, extending as shown at an angle to the axis of the lens. Mirror 11 may be provided with an arm 13 extending within the submarine and having worm teeth 14 with which the worm 15 on shaft 16 is adapted to engage. By rotating the hand wheel 17 on said shaft it will readily be seen that the mirror 11 is rocked on said pivot and will thereby vary the direction of the beam (see Figs. 2 and 5); that is, the beam, if the parts are in position shown in Fig. 2 may thereby be directed upwardly at various angles to the vertical.

As above stated the annular ring 9 is rotatably mounted between the annulus 18 secured to the wall of the submarine and a detachable but stationary member 19 which is shown as secured to annulus 18 through the intermediary of a second ring 20. The member 19 is provided with teeth 21 with which a worm 22 on shaft 23 is adapted to engage. When turning hand wheel 24 therefore the worm 22 will progress around the stationary rack 21 and carry with it the member 9. Both shafts 16 and 23 are journaled on brackets 25, 25' secured to member 9. By this or similar means the mirror 11 may be rotated around the axis of the beam thereby providing means whereby the beam may be projected either up or down, forward or back. This means, in conjunction with the adjusting of the mirror about pivot 12 provides means for deflecting the beam in every direction except to the side of the submarine opposite the searchlight. It should also be noted that the mirror 11 can be revolved around pivot 12 until it is entirely without a beam so that the beam may be projected straight out of the side of the submarine (see dotted lines in Fig. 5).

In order to provide a means whereby the lens 8 may be removed and cleaned while the submarine is in the water I prefer to make use of a detachable cap 125 which is shown as threaded within annulus 18 from without the submarine. When it is desired to remove the lens and attached parts, therefore, all that is necessary to be done is to screw cap 125 in place and remove the member 20. In normal operation the cap is removed so that the back of the mirror 11 is flush with the wall W of the submarine.

It should, of course, be remembered that it is not only necessary to provide a powerful source of illumination in order to see under water, but it is also necessary to have means for viewing the object so illumined. For this purpose I prefer to provide at predetermined points in the wall of the submarine sighting devices 27 such as telescopes or the like. These devices may be secured in closures 28 over openings 29 in the wall W of the submarine similar to the corresponding parts for the searchlight beam.

In connection therewith I provide a mirror or other deflecting means 30 pivoted without the submarine and rotatably mount the member 28 within the opening. A hand wheel 33 is shown as provided to rotate the member 28 with all attached parts around the axis of the sighting instrument 27. The sighting devices are preferably positioned at a distance from the searchlight since I find that an illumined object may be seen much more clearly if viewed to one side of the searchlight than if viewed directly in line with the beam, as by this means the screening effect caused by the total reflection and refraction of a large portion of the light by the particles of water or of solid particles suspended therein is avoided.

The direction of the searchlight beam may be adjusted by hand wheels 17 and 24 as above described, but I prefer to adjust the beam from a distance, preferably from near, or by means of, one or more of the sighting devices. For this purpose I have shown a transmitter 35 mounted so as to be rotated when the sighting device is adjusted in one direction or the other. I prefer to mount the transmitter 35 on the shaft of hand wheel 33 and the second transmitter 36 on the shaft of hand wheel 31. The said transmitters are in circuit with step-by-step repeater motors 37—38 mounted adjacent the opening through the wall of the submarine for the searchlight beam. The said motors may be used to turn directly the worms 22 and 15 respectively, but on account of the possibility of such motors falling out of step if loaded heavily, I prefer to employ in connection therewith what I term a follow-up system. According to such a system I attach to the motor a brush or trolley 40 adjusted to contact with contact strips 41 or 42 on a drum 43. The said drum may be mounted on the shaft 44 of a reversible motor 45 or connected in some other way to said motor.

Motor 45 performs the actual work of turning worm 15 and is shown as geared to shaft 16 through pinion 46 and gear 47. The electrical connections of such parts are shown in Fig. 7 wherein it will be readily seen that the reversible motor 45 will cause the drum 43 carrying the reversing contacts to follow the brush 40 to any position it may move and will thereby rotate the shaft 16 and mirror 11 about pivot 12. Motor 45' rotates shaft 23 in a similar manner by following repeater motor 37.

Not only may sighting means such as device 27 be utilized when the submarine is under water, but the usual periscopes 50 may also be employed for observations in a horizontal plane. In order that the searchlight may be controlled from the periscopes if desired, I have shown in Fig. 9 a transmitter 35' mounted on the periscope and geared to stationary annular gear 150 through pinion 151 so as to be actuated by rotation thereof. Said transmitter may be mounted in a small box 51 in the position shown in Fig. 6.

As shown in Fig. 8 projection 4 is preferably in the form of a condenser so that the beam is reflected therefrom in the form of converging rays. The lens 8 is so designed as to render said rays parallel with the positive crater 3 in a predetermined position, but it will be evident that if said light source is shifted that the rays will not be parallel after emerging from said lens, but will be either converged or diverged depending on the direction in which the light source is shifted. On account of the high absorption qualities of water I find it desirable in some instances to have the rays converge on the observed object. In order to accomplish this I provide means for adjusting the position of the light source either at the searchlight or from a distance.

This may consist of a repeater motor 60 actuated by a transmitter 61 positioned in any desired location and rotating either directly or indirectly a threaded shaft 62 on which is mounted the slidable box 63 supporting the electrode holders 1 and 2 and containing the searchlight control mechanism. A handle 100 may also be provided on said shaft.

I prefer to employ between the said repeater motor and said shaft a follow-up reversible motor 64 actuated from a trolley 65 on the repeater motor and reversing contacts 66 on the follow-up motor in a manner similar to the follow-up system above described. Said motor 64 is shown as geared to the shaft 62 by means of gears 165 and a pinion not shown.

Since the continual showing of a light underneath the water by a submarine would furnish to an enemy a sure means of detection, I prefer to construct the light so as to be quickly lighted and quickly extinguished. In order to shut off completely all after-glow I prefer to employ a shutter mechanism 66' such as shown and described in my copending application 95,724, light extinguisher for arc lamps, filed May 5, 1916. Said extinguisher is shown as comprising a pair of shields 67 supported on legs 68, 69 and rotated in opposite directions from shaft 70 by means of bevel gears 71—72. The said shaft is normally rotated by means of spring 73 in such direction as to hold the shields in a closed position (see dotted lines in Fig. 8), but when the arc is struck the negative holder 2 is drawn back moving rack bar 75 and revolving the shaft to open the shield. The shield of course snaps closed when the current is shut off. If desired, means independent of the arc striking mechanism may be provided to operate the shields so that they may be closed and opened while the arc lamp is lighted.

Fig. 10 shows a simplified form of sighting device for seeing from a submarine. This consists merely in a telescopic device 110 slidably and rotatably mounted in a holder 111 secured to the inner side of wall W of the submarine. The telescope is provided adjacent its outer end with a prism or mirror 112 whereby the line of sight is turned through a substantial angle. When it is desired to see through the telescope it is thrust out into dotted line position shown in Fig. 10. The telescope can then be revolved so that the observer may look in the proper direction. The prism may also be adjustably mounted if desired, being shown as pivoted at 113 within the telescope. A flexible member 114 secured to said prism and extending to a point adjacent the eye piece 115 may be used to adjust the angular position of the prism about the said pivot. It will be understood that the plate 125' is normally removed, its use being similar to that of plate 125.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a submarine vessel, of a searchlight therein contained, means for projecting the beam without the vessel, and adjustable means for altering the direction of the beam with respect to said searchlight.

2. The combination with a submarine vessel, of a source of light therein contained, means for projecting the beam without the vessel, and means without but adjustable from within the vessel for altering the direction of the beam.

3. The combination with a vessel having a wall located under the water, of a searchlight located within said wall, including a condenser for converging the rays of the beam, and a lens in the wall adapted to render the rays of the beam substantially parallel.

4. The combination with a vessel having a wall located under the water, of a searchlight located within said wall, an opening in said wall, a closure for said opening containing a window, a light deflecting means secured to said closure, and means whereby said closure and deflecting means may be revolved.

5. The combination with a vessel having a wall located under the water, of a searchlight located within said wall, an opening in said wall, a closure for said opening containing a window, a light deflecting means pivoted to said closure for angular adjustment with respect thereto, means whereby said closure and deflecting means may be revolved, and means for angularly adjusting said deflector on said closure.

6. The combination of a vessel having a wall located under the water, of a light source within said wall, a projector for the beam from said source, a lens in the wall for rendering the rays of said beam substantially parallel for a given position of said source with relation to said projector, and means for altering at will the relative positions of said projector and said light source to vary the character of the beam.

7. The combination of a vessel having a wall located under the water, of a searchlight within said wall, said searchlight including a projector together with electrodes and electrode holders located adjacent but to one side of said projector, whereby said electrodes and holders are substantially without the projected beam, and a lens in said wall adapted to render the rays of the beam substantially parallel.

8. The combination with a vessel having a wall located under the water, of a searchlight located within said wall, an opening in said wall, a closure for said opening containing a window, a light deflecting means pivoted to said closure for angular adjustment with respect thereto, and means for angularly adjusting said deflector on said closure.

9. The combination with a submarine vessel of a stationary searchlight located therein, and movable light deflecting means located without the submarine for turning the beam in different directions.

10. The combination with a vessel having a wall located under the water, of a searchlight located within said vessel, including a projector for the beam, a lens in the wall adapted to render the rays of the beam substantially parallel, and deflecting means for changing the direction of the beam.

11. The combination with a vessel having a wall located under the water, of a searchlight, within said vessel, an opening in said wall, a closure for said opening containing a window adapted to receive rays from said searchlight, and light deflecting means pivoted to said closure.

12. The combination with a vessel having a wall located under the water, of a light source within said vessel, and means for projecting light from said source under the water and in a direction substantially parallel to said wall.

13. The combination with a vessel having a wall located under the water, of a light source within said vessel, means for projecting a beam from said source through said wall, and means for causing said beam to assume any one of a plurality of directions in a plane substantially parallel to said wall.

In testimony whereof I have affixed my signature.

ELMER A. SPERRY.